United States Patent
Pardo-Blazquez et al.

(10) Patent No.: US 7,836,484 B2
(45) Date of Patent: Nov. 16, 2010

(54) METHOD AND APPARATUS FOR PROVIDING ACCESS TO AN IDENTITY SERVICE

(75) Inventors: Avelina Pardo-Blazquez, Madrid (ES); Fuencisla Garcia Azorero, Madrid (ES); Maria Esther Bas Sanchez, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1041 days.

(21) Appl. No.: 11/568,965

(22) PCT Filed: May 11, 2004

(86) PCT No.: PCT/SE2004/000720

§ 371 (c)(1),
(2), (4) Date: Nov. 10, 2006

(87) PCT Pub. No.: WO2005/109822

PCT Pub. Date: Nov. 17, 2005

(65) Prior Publication Data

US 2007/0226774 A1  Sep. 27, 2007

(51) Int. Cl.
*G06F 17/30* (2006.01)
(52) U.S. Cl. .......... 726/1; 726/6; 726/26; 709/203; 709/223; 709/224; 709/227; 709/229
(58) Field of Classification Search ............. 726/1, 726/6, 26; 709/203, 223, 224, 227, 229
See application file for complete search history.

(56) References Cited

U.S. PATENT DOCUMENTS 7,565,356 B1 * 7/2009 Xu et al. .............. 707/10

OTHER PUBLICATIONS

Jonathan Sergent et al., "Liberty ID-WSF Discovery Service Specification Version: 1.1", pp. 1-33., (Apr. 21, 2004), http://www.projectliberty.org/specs.*

* cited by examiner

*Primary Examiner*—Kieu Oanh Bui
*Assistant Examiner*—Hee Song

(57) ABSTRACT

Method, apparatus and computer program for providing access to identity services of users. A Discovery Service DS server (100) stores for a set of users references (RO1A,ROnB) of identity services (IDSRV-A,IDSRV-B) available for them and usable to contact respectively with the Service Providers SPs (120,130) hosting each of said identity services. For a given identity service not yet registered for a given user, the DS server selects a SP (140) that is able to provide it, and stores a new resource offering (RO2X) that corresponds to the registration of said identity service. For selecting the appropriate SP, the DS server can check a service capability storage (103-2,301) that comprises information about what identity service(s) can be provided by a given SP, and which can be dynamically updated from SPs with the identity services they respectively support. The DS server can contact the user to collect SP preferences and/or service data.

26 Claims, 9 Drawing Sheets

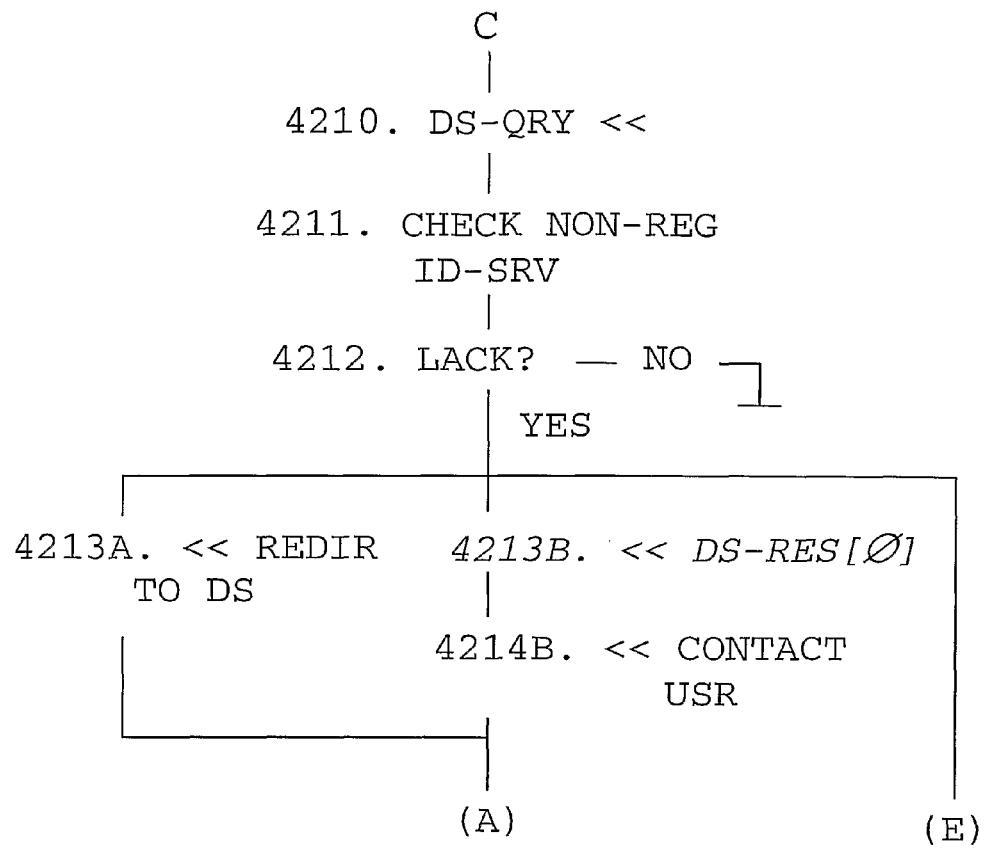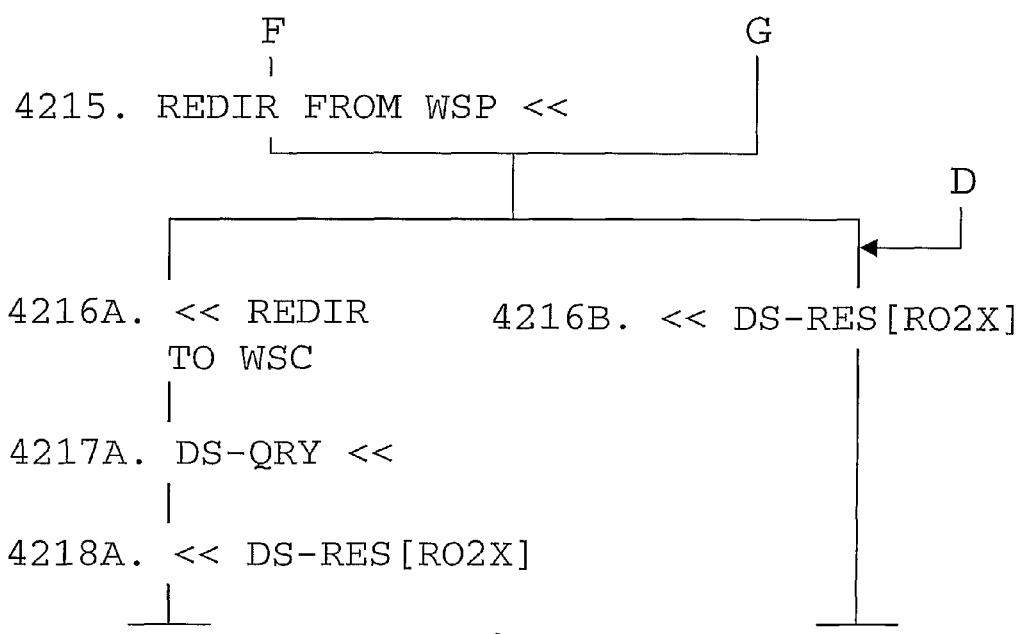
Fig. 7

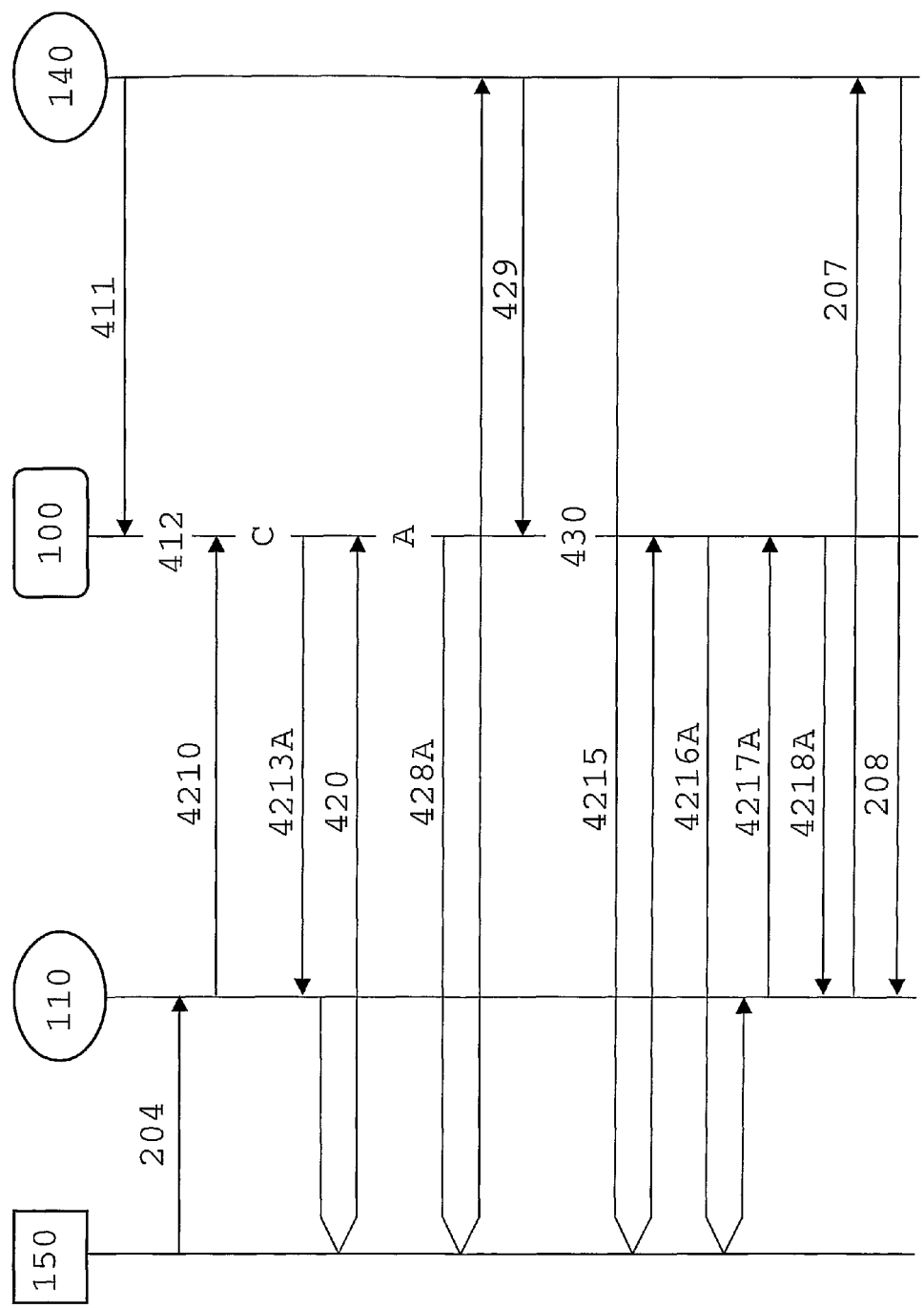

METHOD AND APPARATUS FOR PROVIDING ACCESS TO AN IDENTITY SERVICE

FIELD OF THE INVENTION

The present invention relates to the provision of services in an identity federation framework and, more precisely, to a method for providing access to an identity service of a user and to the apparatus involved therein.

BACKGROUND

The first kind of services offered through the Internet have been commonly limited to one-to-one, (customer-to-business, user-to-provider, etc) relationship. In this kind of primary service scenario a Service Provider (hereinafter also referred as SP) can provide one or a plurality of services to a plurality of users. While some of said services can be provided on a (let's say) common general basis and consist, for example, on mere information services available to any user and/or being no subject to any user-based customization or authorization; some others services can be customized according to the served user and be, for example, subject to a previous identification and authorization of said user, which could be needed, for example, when the service or its content is to be adapted according to each particular served user or according to his preferences, and/or when the service to be rendered only for those users who has a service account with the SP (e.g. users who has subscribed to the service with the SP).

In the particular case in which the provision of a service is subject to user identification, the SPs implement mechanisms to carry out user authentication, which, commonly, drives to the storage and management of user credentials (e.g. user identifiers and passwords) on each SP. However, this simplified approach can put some inconvenience on the user side for users having various service accounts with various SPs, since they have to remember their credentials to access to the different services provided by these SPs. A user may try to override this drawback by utilizing the same credentials across all these SPs, which might in some cases be not possible (e.g. because a SP impose, at least, the user identifier, or because the same selected user identifier is already assigned to another user in the same SP). However, in any case, the user is forced to provide his credentials every time he accesses a SP.

Identity federation frameworks have been recently developed to, primarily, fix this problem. In short, an identity federation framework comprises a set of functional entities (SPs and others that shall be later cited) and a set of mechanisms which allow a plurality of SPs to share federated identity information of users between them. In this context the term "identity" of a user (also known as "network identity") refers to the set of attributes that, for said user, are held in the respective service account(s) said user has across one or various SPs.

The "Liberty Alliance Project" LAP (http://www.projectliberty.org/) is a standardization forum for the standardization of identity federation frameworks. Accordingly, some LAP specific terms, functional procedures and functional entities will be referred across this application to illustrate, by way of examples, the functional operation of a well known standardized identity federation framework which, those skilled in the art, would readily identify with the equivalent terms, functional procedures and functional entities of similar frameworks that also provide identity federation.

A first goal of an identity federation framework was to provide the so-called SSO ("Single Sign-On", also known as "Simplified Sign-On"). SSO allows the users to securely access different services and applications, which can be accessed through SPs that can be even dispersed across different network or administrative domains, without being authenticated every time. The current principle behind SSO states that, for a given session, users shall be able to authenticate once, and then, shall be given access to all their subscribed services that accept such level of authentication. This principle enables a user to access different services without explicitly authenticating for each particular different service he might request. SSO is accomplished by authenticating a user once, and then, with the mediation of a server entity, commonly known as "Identity Provider" IDP, making the resulting authentication valid for entrance to other SPs.

A further goal of an identity federation framework is to provide a new kind of services based on the federated identity of the users. In short, these new kind of services consider the consumption of resources of the federated identities of users across SPs. The term "resource" is a generic term which may refer indistinctly: to data attributes of a federated identity of a user, including those which have a more static nature (such as his name, employee number, user identifier in a given service or network, etc), as well as those which can be more dynamic nature (e.g. data attributes which depends on some service for said user, such as calendar data, current geographical position, etc); and also to services acting on behalf of a user's federated identity (e.g. services which performs some action for his identity, such as sending a short message, sending an electronic mail, etc). In this scenario, a given SP can offer a given service to a user that, for its completion, might need (e.g. as an optional feature, or as an essential feature) the consumption of a resource of the federated identity of said user (e.g. use his credit card number, check or set data on his web-based calendar, use personal information, etc); wherein said resource can be stored and primarily handled in another SP. Said "consumption" can comprise, not only the retrieval and/or updating of said resources, but also the performance of some action on the benefit of an identity (e.g. an attribute of an identity of a user in a SP comprises his mobile phone number, being the action to send a Short Message to this number from this SP). Accordingly a new kind of services can be offered to a user from a SP that, for their accomplishment/customization/etc, can go beyond the mere usage of the own data said SP locally hold for said user.

The provision of this new kind of services is commonly achieved with the intervention of a server entity that provides what is usually known as "discovery service" DS that allows a first SP to access to a second SP which holds the wanted resource. Across the present application the term "Discovery Service server" (or DS server) shall be used to refer to a server entity which provides a Discovery Service DS, regardless of whether said server entity resides in a server machine that further provides or not any other kind of service.

In the terminology commonly used in identity federation frameworks, the aforementioned second SP would act as a WSP (Web Service Provider), and the aforementioned first SP would act as a WSC (Web Service Consumer); whilst the service that allows a WSC to access to an WSP to act upon some resource for, either, retrieving or updating information about an identity, or performing some action for the benefit of said identity, is known as "identity service". In this terminology context, a DS server provides a "discovery service" DS which allows a plurality of WSCs to dynamically discover the registered identity services of a user, so as to provide them with information usable to access to the corresponding WSPs.

A DS server is thus a functional entity that acts as a register to store information about the identity services of some users, and that provides said information upon request. The information that stores a DS server for each registered identity service of a given user is commonly known as "resource offering" RO, and its content is usable to uniquely identify a given identity service instance of a user. For example, for providing access to a "calendar" service of a user that stores his appointments and tasks, the DS server stores a RO that, among other, can comprise: an identifier of the service type to differentiate different kind of services (Service Type), an identifier which identifies uniquely a service instance of said service type which relates to said user (e.g to differentiate from the "calendar" of other user) (Resource ID), and an identifier which identifies the SP hosting said service for said user (Provider ID). All of these identifiers may have the form of Uniform Resource Identifiers URIs, although other representation formats (for example a single URI) are also possible as long as they provide a reference usable to contact with the corresponding SP so as to identify and access a given identity service of a given user.

To provide a discovery service DS, a state-of-the-art DS server is arranged to receive and answer two kind of requests: a first kind of request asking to modify a "resource offering" RO (either to insert a new RO, or to remove an stored RO), hereinafter referred as "Discovery Service update" DS-update; and a second kind of request requesting to obtain an stored RO, hereinafter referred as "Discovery Service query" DS-query, which answered by the DS server with a "Discovery Service response" DS-response comprising the corresponding RO(s).

Due to its own nature, the "discovery service" DS is itself an identity service that provides a consumption (in the form of discovery) of a special set of "resources" (i.e. Resource Offerings, ROs). A specification describing a Discovery Service in an identity web-services framework has been released by LAP as "Liberty ID-WSF Discovery Service Specification" version 1.1 (available in https://www.projectliberty.org/specs/liberty-idwsf-disco-svc-v1.1.pdf).

A brief example of this kind of new services, as well as a brief explanation about the functional relationships among the entities in an identity federation framework, shall now be given with references to FIGS. 1 and 2.

A plurality of SPs (110,120,130,140), a IDP (90), a DS server (100) and a human user (150-2) interacting with a user terminal (150-1) are schematically shown in FIG. 1. It is to be noticed here that, in LAP specific terminology, the generic term "principal" is used to refer to an entity that can acquire a federated identity; wherein the scope of the term "principal" can embody: human users, groups of human users, corporations, legal entities, or even functional serving entities. Since all those types of "principals" are actually "users" of the identity federation (or can become so), the term "user" (150) shall hereinafter be used in this application to refer indistinctly to a user of the identity federation regardless his/its type. The SPs of FIG. 1 (110,120,130,140) could represent each one or more server entities that can belong to the domain of one or more service provider organization; wherein each server entity may be co-located within the same server machine, such as a computer-based machine, or be distributed across various machines. Similarly, the corresponding functionality disclosed for the IDP or for the DS server could also be distributed across more than one machine (e.g. each performing a sub-function of the total functionality), or be co-located within the same machine. However, for the sake of simplicity, each of the server entities represented (90,100, 110,120,130,140) can be assumed to represent a single machine, each implementing the corresponding disclosed functionality; although it shall be noticed that, in common practical implementations, the functionality of the IDP and the functionality of the Discovery Service use to be co-located within the same server machine.

For simplicity, only one DS server has been represented in FIG. 1; however, more than one DS server may exist within a telecommunications system which provides an identity federation framework; wherein, for example, each DS server is assigned to serve a Discovery Service to a set of users of said federation.

The user (150) can communicate (11) with more than one SP (110,120,130) and, as cited earlier, gain access to different services that are subject to user authentication by using SSO feature. SPs and IDP can also communicate (10) for authenticating users and for the delivery of, among other, authentication assertions. For example, the user (150) establishes a first communication with SP 110 and gets authenticated in this SP. The IDP (90) is involved in this authentication and, when the user establish a further communication with e.g. SP 120, the IDP provides an authentication assertion to SP 120, which grants access to the corresponding service in this SP without the user having to provide his credentials again.

As a part of the data exchanged between an IDP and SPs during the SSO authentication process of a user, the IDP can further provide to any SP contacted by the user (110,120,130) a reference usable to contact with the DS server (100) so as to obtain RO(s) of said user from said DS server (if needed). Said reference usable to contact with the DS is also considered as a "resource offering" itself (referred as RO-DS hereinafter), since it is used to access to an identity service, which, as cited earlier, is provided by the DS server (i.e. the "discovery service" DS). Further communications (12) can be established between SPs to access to identity services of the user (150).

The signaling flow shown in FIG. 2 shall now be used to explain how a RO for a given identity service of a user is stored in the DS server, and how it is further accessed. In a first step (flow 201), the user (150) access to a given SP (130) and decides to subscribe a given service offered by this SP. For example, SP 130 (e.g. a trade bank) offers a secure payment service via web; or, for example, SP 130 offers a calendar service which can be checked by the user via a web browser application from a personal computer or mobile phone, and which can also be checked (or updated) to provide other services (or as a result of other services). The access of the user to the SP, so as to request the subscription to a given service, may begin by sending an HTTP message (typically a HTTP "Get") to a registration URL (Uniform Resource Locator) which is known by the user, or which is indicated by the SP on a web page. In the next step shown (flow 202), SP 130 sends a "discovery service update" DS-update to the DS server 100 that contains the corresponding RO for accessing said identity service for said user in said SP 130. The use of said RO may allow another SP (110), for example, to obtain a payment assertion for goods that are acquired by said user, or to check or update the user's calendar data.

As a result of a received DS-update, the DS server stores (203) the received RO. As shown schematically in FIG. 1, the DS server has a data storage (103-1) to store the plurality of ROs (RO1A,RO1B,RO2A,ROnB) for each of the users (USR-1,USR-2 . . . , USR-n) it serves a discovery service, and for each of the identity services that have been registered for each of said users.

Later, user 150 accesses SP 110 (flow 204), which, for example, offers a flight booking service accepting payments via web, and that further offers, e.g. as an extra feature, the checking and/or updating of the user's calendar (e.g. verifying user's availability marking the flying time as "unavailable", setting a task to pick the ticket, etc.). Given that user (150) has been previously authenticated with the intervention of the IDP (90) (signaling flows not shown in FIG. 2), the SP 110 has obtained from the IDP a reference usable to contact with the DS (a RO itself, RO-DS, as mentioned above). Then, for example, to check or update the user's calendar, or to obtain a payment assertion for a booked flight, SP 110 sends a "discovery service query" DS-query (flow 205) to the DS server (100). The DS-query (205) comprises the resource identifier (Resource ID) of the RO obtained to access to the DS server (RO-DS), which allows the DS server to identify the particular user (150) involved, and can also comprise an identifier of the requested identity service (e.g. a Service Type identifier established for identifying the "calendar" service).

If a received DS-query comprises an identifier of a particular identity service (Service Type), the DS server (100) checks whether there is a RO registered for said service and said user. If the DS-query is received without an identifier of an identity service type, the DS server would answer back with a "discovery service response" DS-response (flow 206) with all the ROs stored for the referenced user. For example (with reference to the content of storage 103-1 in FIG. 1), in case of USR-1, it would answer back with a DS-response comprising RO1A and RO1B, or, in case of USR-2, with RO2A). Otherwise, if a received DS-query comprises an identifier of a particular identity service, the DS server would answer back with only the RO that corresponds to the indicated identity service (e.g. RO1B). Once obtained a DS-response (flow 206), SP 110 can use data of the obtained RO to invoke the identity service by communicating with the SP (130) which hosts the resource concerned by said identity service (flows 207,208) (thereby, e.g., accessing or updating the user calendar, obtaining a payment assertion, user profile data, etc).

However, when an identity service indicated in the DS-query is a non-registered identity service for said user (i.e. no RO is stored in the DS-server 100 for that identity service), or when there are no identity services at all registered for said user in the DS-server; the subsequent DS-response (206) is sent empty. Depending on the nature of the service which the SP 110 intends to provide to the user 150, this event can cause the final denial of said service, or, as a minimal consequence, an eventual reduction on the quality of the final service provided, which, for example, can require the user to manually indicate to SP 110 some of the needed data that, otherwise, would have been automatically obtained through the identity service if it was registered.

The user can overcome the aforementioned problem by contacting with a SP that can provide the identity service, so as to register for him the until now non-registered identity service. However, the user might have to contact with several SPs until he finally finds out one that can provide said identity service. Once found, the user could subscribe it, whereby flows 201 and 202 described above could run so as to register said identity service for said user in the DS server; and then, e.g., if he still wants to gain access to a service that was neglected, the user can go back and contact again with the SP (110) where the discovery of said identity service failed.

However, none of this can prevent that the same situation described above could be repeated for other identity services this user might later need which still remain as non-registered identity services for him. Moreover, new services can be quickly developed and implemented by SPs, which can involve the eventual provision and requests of new identity services. However, the state-of-the-art mechanisms for the registration of identity services (as described with reference to flows 201 and 202) prevents a quick deployment of said new services, since a user will still be forced to find the appropriate SPs and contact with them (201) so as to achieve said SPs to make the corresponding registrations (202) of the wanted identity services for him into a DS server.

SUMMARY OF THE INVENTION

The present invention overcomes these problems by triggering the registration process for a non-registered identity service of a user from a Discovery Service server. This is achieved by a method as claimed in claim 1, or by a Discovery Service server as claimed in claim 16. Embodiments of the invention are set out in the dependent claims.

In addition to the known features for providing a Discovery Service, so as to register an identity service of a user and, subsequently, provide access to said registered identity service; the method, Discovery Service server and computer program according to the invention comprise, respectively, steps, means and computer readable program code to select from a Discovery Service server a Service Provider for providing an identity service not yet registered for a user, and to store in said Discovery Service server a resource offering for registering said identity service of said user as provided by said selected Service Provider.

By triggering the registration process for registering a non-registered identity service of a user from a Discovery Service server, said user is alleviated of having an accurate knowledge about what identity services can he benefit from, and also alleviated of having to find by himself a Service Provider which can host said identity services. Since a Discovery Service server knows the identity services registered for a given user, it can start the registration of a not yet registered identity service for said user, thus, making possible to access to said identity service before or when said service is first requested. Furthermore, the knowledge in a Discovery Service server about the registered identity services of users, make feasible to select a Service Provider according to user preferences concerning Service Providers and/or service capabilities of said Service Providers, which can be derivable in the Discovery Service server from the content of the resource offerings of previously registered identity services.

The invention provides various embodiments that can advantageously be implemented in a Discovery Service server for the selection of a Service Provider, as well as for the creation of the corresponding resource offering for registering an unregistered identity service for a user; although, in a minimal realization, the Discovery Service server can directly select a suitable candidate Service Provider and build up with the relevant data the corresponding resource offering.

According to one embodiment, the Discovery Service server can check a service capability storage to select a Service Provider that can provide said identity service. Among other data, the service capability storage can comprise, in relationship, identifiers of one or more identity services and identifiers of one or more Service Providers; thus, allowing to check either or both: what identity services can be provided by a given Service Provider and/or what Service Provider(s) can provide a given identity service; therefore, allowing a certain selection of a Service Provider to provide a given identity service.

In one alternative realization, the service capability storage can be stored in an external entity, such as an external database, in which case the Discovery Service server would query it to obtain information about relationships Service Provider(s)/identity service(s) so as to select a Service Provider. Alternatively or additionally a service capability storage can be stored internally within the Discovery Service server, thus allowing an internal check process and avoiding sending a query to an external entity.

The service capability storage, regardless if it is stored in the Discovery Service server or in an external entity, is preferably dynamically updated with capability registrations received from Service Providers which contains information about the identity services they can respectively provide; although it could also be periodically updated by querying to a plurality of known Service Providers to request and update this information. A simple access policy can be established to determine what Service Providers are allowed to send capability registrations or, alternatively, to be queried from the Discovery Service server for the same purpose; thus, allowing if desired that only some trusted Service Providers are selectable candidates when selecting a Service Provider in the Discovery Service server to host an identity service for a user.

The invention provides various embodiments to assess, in different situations, whether a given identity service is a non-registered identity service for one or more users, or to assess whether a given user has one or more identity services not yet registered. In these embodiments, identity services that can be provided are checked against the content of resource offerings stored in the Discovery Service server for the registered identity services of users.

In one embodiment, the aforementioned check is performed at the reception in said Discovery Service server of a discovery service query requesting one, or more, resource offering of a user for accessing to the corresponding identity service(s). In another embodiment, the Discovery Service server can make said check at reception of a capability registration from a Service Provider. In a further embodiment, the check for finding non-registered identity services for one or more users can be performed at a periodical check of the aforementioned service capability storage. In still a further embodiment, the check for determining the non-registered identity services of a user can be made at reception in the Discovery Service server of a communication from said user.

According to another embodiment, the Discovery Service server can, upon detection of a non-registered identity service for a given user, request to establish a communication with said user.

According to still a further embodiment, a user can communicate with the Discovery Service server; thus allowing it, either or both: to collect from the user service provider preferences, or to collect service related data usable for the provision of an identity service from a selected Service Provider. Said communication can be a result of a communication request previously made from the Discovery Service server, as indicated above, or be a spontaneous communication received from a user. For a given identity service non-registered for said user, the Discovery Service server can select a Service Provider to provide said identity service according to the service provider preferences indicated by the user and, if applicable, forward to it part or all of the received service related data; thus alleviating the selected Service Provider of having to collect later these data from the user, if such action is needed for the concerned service.

Further embodiments of the invention relates to situations in which, for providing the resource offering for the non-registered identity service in the Discovery Service server, the intervention of the selected Service Provider is needed. Among others, this can be the case wherein the Discovery Service server does not have all or any of the data needed to build up the corresponding resource offering and some or all these data need to be generated and later received from the selected Service Provider, or wherein the selected Service Provider needs to collect from the user service related data or request user consent for the service provision and/or to establish access policies. In these cases, the Discovery Service server sends to the selected Service Provider a request for providing an identity service for a user; wherein said request for providing can, optionally, further comprise service related data for personalizing and/or adapting the provision of said service for said user, which may have been collected by the Discovery Service server. As a result of said request for providing, the selected Service Provider can send to the Discovery Service server a discovery service update that contains a resource offering for registering in said Discovery Service server the corresponding identity service.

According to one embodiment, the Discovery Service server sends the request for providing directly to the selected Service Provider. According to a further embodiment, applicable when the user is in communication with the Discovery Service server, the Discovery Service server sends the request for providing embedded within a redirection of said communication towards the selected Service Provider. According to a still further embodiment, when the Discovery Service server has received a discovery service query requesting a resource offering of a user for accessing to a not yet registered identity service of said user, the request for providing is conveyed within a discovery service response sent as an answer to said discovery service request.

BRIEF DESCRIPTION OF DRAWINGS

FIGS. 5 to 7 shows detailed flowcharts illustrating embodiments of the steps shown in the simplified flowchart of FIG. 4.

FIGS. 8 and 9 shows simplified signaling flows corresponding to some of the embodiments illustrated in the flowcharts of FIGS. 5 to 7.

DETAILED DESCRIPTION

Some exemplary embodiments of the invention shall now be described in detail with references to FIGS. 3 to 9.

Figure 3:
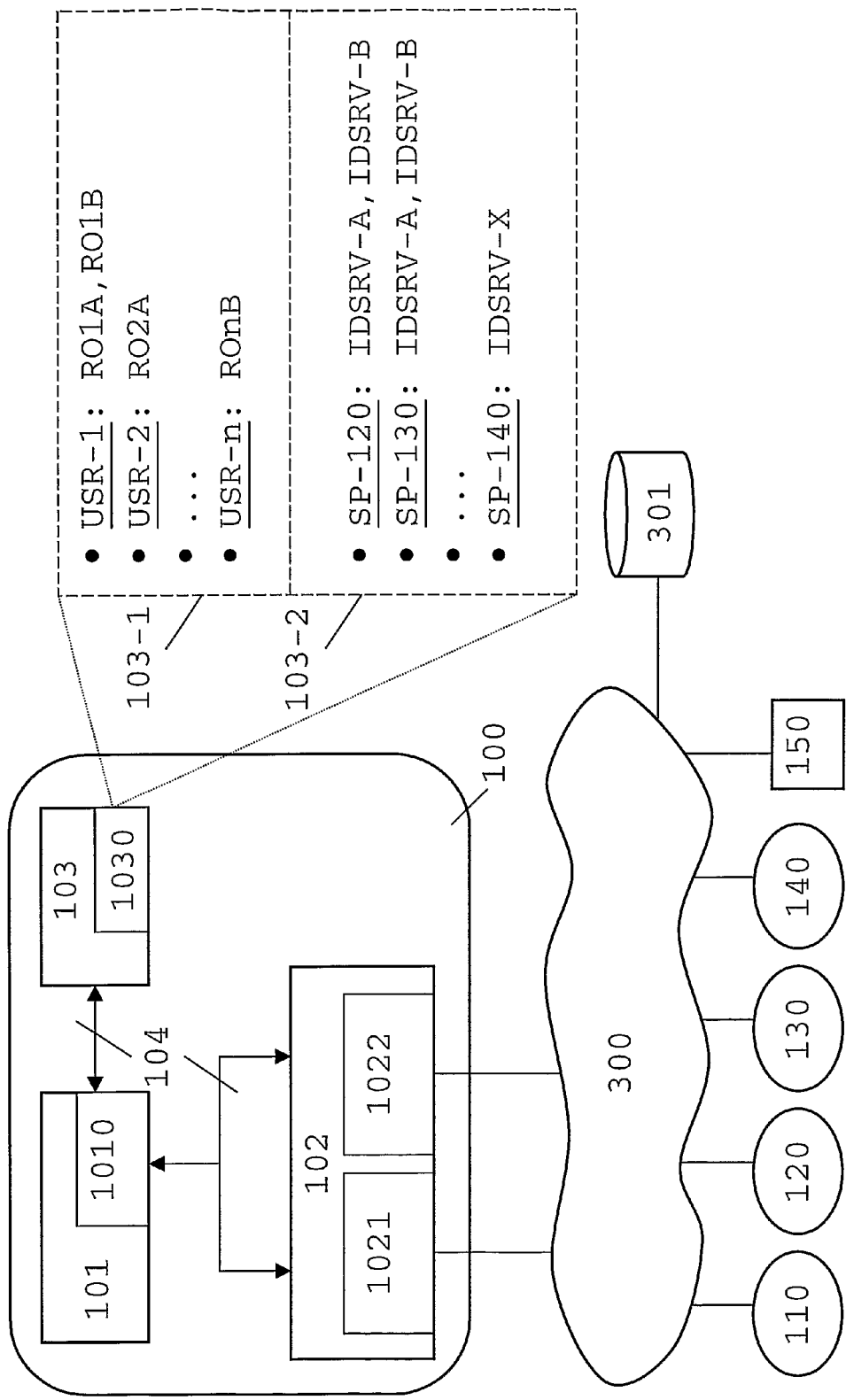
FIG. 3 shows a similar view as the one shown in FIG. 1, wherein some functional modules and data content of a Discovery Service server according to the invention are schematically illustrated.

FIG. 3 shows plurality of SPs (110,120,130,140) and a DS server (100) interconnected through an interconnection network (300), which, in turn, can be built up of a plurality of subnetworks. The interconnection network allows also a user (150) to communicate with one or more SPs, as well as with a DS server (100) or with an IDP (not shown in FIG. 3). The communications between the entities shown in FIG. 3 (some of them represented in the flowcharts and signaling flows of FIG. 5 or 9) can be accomplished by using well known protocols utilized today to provide web services (such as "Hypertext Transfer Protocol" HTTP), which, in turn, can embed further protocols (such as "Simple Object Access Protocol" SOAP) used as envelope and data encoding when exchanging information, requests and responses across communications networks.

A generic internal structure of the DS server (100) is also shown in FIG. 3. It is well known that an apparatus which serves or mediates in the services provided by or through a telecommunications system is, regardless its specific construction details, comprised of one or more functional modules, each arranged to perform a specific sub-function of the total functionality implemented by said apparatus, and, eventually, arranged to cooperate with other functional module(s) in said apparatus. In particular, servers entities in modern telecommunications systems are commonly computer-based apparatuses comprising software and hardware; wherein a specific functional module in one of said apparatus can comprise a part of software, hardware, or a combination of both; said parts being designed to perform a specific (sub)function and, if proceeds, to cooperate with software and/or hardware parts which implements other functional module(s). Once the functionality of a server apparatus for a telecommunications system has been defined, the construction of the functional modules to build up a realization of said apparatus is a matter of routine work for those skilled in the art. Accordingly, a generic internal structure of a DS server (100) shall now be described with reference to some basic functional modules without falling into specific details concerning its construction.

The simplified internal structure of the DS server (100) shown in FIG. 3 comprises: a processing module (101), a communication module (102), a data storage module (103) and one or more internal communication buses (104) which allow data communication and cooperation between them. The processing module (101) can comprise one or more processors (1010), for example, working in load-sharing or active-backup mode. It executes service logic to process the signaling exchanged between the DS server (100) and other entities (110,120,130,140,150,301), as well as to control the other functional modules (102,103) in the DS server, so as to provide a discovery service as known from the prior art, also enhanced with the functionality described hereinafter.

External communications are performed through the communication module (102) that can comprise one or more communication devices (1021,1022). For example, there can be one or more communication devices (1021,1022), each devoted to a specific kind of communication (e.g. only with SPs, only for a given type of communication protocol, etc). Also, one or more communication devices (1021,1022) could be suitable to be used in any kind of communication, wherein its number could vary according to its individual capacity for handling external signaling compared with the overall external signaling estimated for the DS server.

A data storage module (103), which can comprise one or more data storage devices (1030), is used in the DS server to store data needed for its operation. Data storage devices (e.g. memory chips, magnetic or optical discs, etc) are well known in the state of the art, which allows the data storage module (103) of the DS server (100) to use one or more storage devices of the same or different kind (e.g. according to criteria such as data access speed required, reliability desired for certain stored data, etc). Two data storage areas (103-1,103-2) are highlighted in FIG. 3. It shall be noticed that these two storage areas are just independent logically, thus, this does not necessarily compel they are respectively contained on separated storage devices. For example, the total storage addressable area of the data storage module (103) can comprise the individual storage addressable areas of more than one storage device (1030), which, using well known addressing techniques, allows to hide data storage details; wherein different storage areas (e.g. 103-1,103-2) can be defined and differentiated by assigning them different addressable areas.

A first data storage area (103-1) stores a plurality of resource offerings ROs (RO1A,RO1B,RO2A,ROnB). As cited earlier, a RO is stored in the DS server for each identity service that have been registered for a user and is usable to access to the SP hosting said identity service for said user so as to request it. For example, the RO noted as "RO2A" could exemplify the RO of the user "USR-2" for the identity service "A". Beyond the notation used only for exemplary purposes, the RO "RO2A" may comprise: a service type identifier to distinguish the type of this identity service ("A") from others (referred as Service Type in the aforementioned LAP DS specification); an identifier which identifies the SP hosting identity service "A" for said user (referred as Provider ID in the aforementioned LAP DS specification); and also a service instance identifier, to distinguish the service instance of this identity service which corresponds to said user in said SP (referred as Resource ID in the aforementioned LAP DS specification).

A second data storage area (103-2) is also provided according to the invention to store service capability information concerning the identity services which can be provided from a plurality of SPs. This second storage area (103-2) can comprise, in relationship, identifiers of one or more identity services (IDSRV-A,IDSRV-B . . . , IDSRV-X) and identifiers of one or more SPs which provides them (SP-120,SP-130 . . . , SP-140). Alternatively, this service capability storage can be held on an external data base (301) with essentially the same content as described above. In either case: internal or external storage of the service capability information, a check on the service capability storage (103-2,301) using an identifier of an identity service could provide back information about one or more SPs which can provide said service; and, a check using an identifier of a SP could provide back the identifier of one or more identity services which said SP is arranged to provide.

Thus, the checking of the service capability storage (103-2,301) can provide information about what identity service(s) can be provided by a given SP, or what SP(s) can provide a given identity service.

There can be changes in the SPs that affects to the identity services they can provide. The most common case may be that a given SP is provided with new service logic so as to provide a new identity service it did not provide earlier; however, there can be also the case wherein a SP withdraws the provision of a given identity service from a given date, or even the case of a new SP which is just set up into cooperation with the rest of entities in the identity federation framework and which is able to provide one or a plurality of identity services. Thus, the service capability storage (103-2,301) can be a central point where to dynamically report and update changes concerning the relationship between SPs and the identity services they can provide. An alternative to perform said dynamic update is that a SP sends a "capability registration" message to the DS server (in case that capability storage 103-2 is used) or to the external data base (301). The "capability registration" message could contain, for example, an identifier of the SP it relates, identifiers of one or more identity services and, for an indicated identity service, a code which can state whether it is a provision or a withdrawal. It shall be noticed here that, for simplicity, only one DS server is shown in the examples; however, more than one server entity can exist in an identity federation framework (e.g. each providing a Discovery Service DS to a set of users of said federation). In these cases a SP that undergoes a change concerning the identity service(s) it provides, may send a capability update to more than one DS server.

Figure 1:
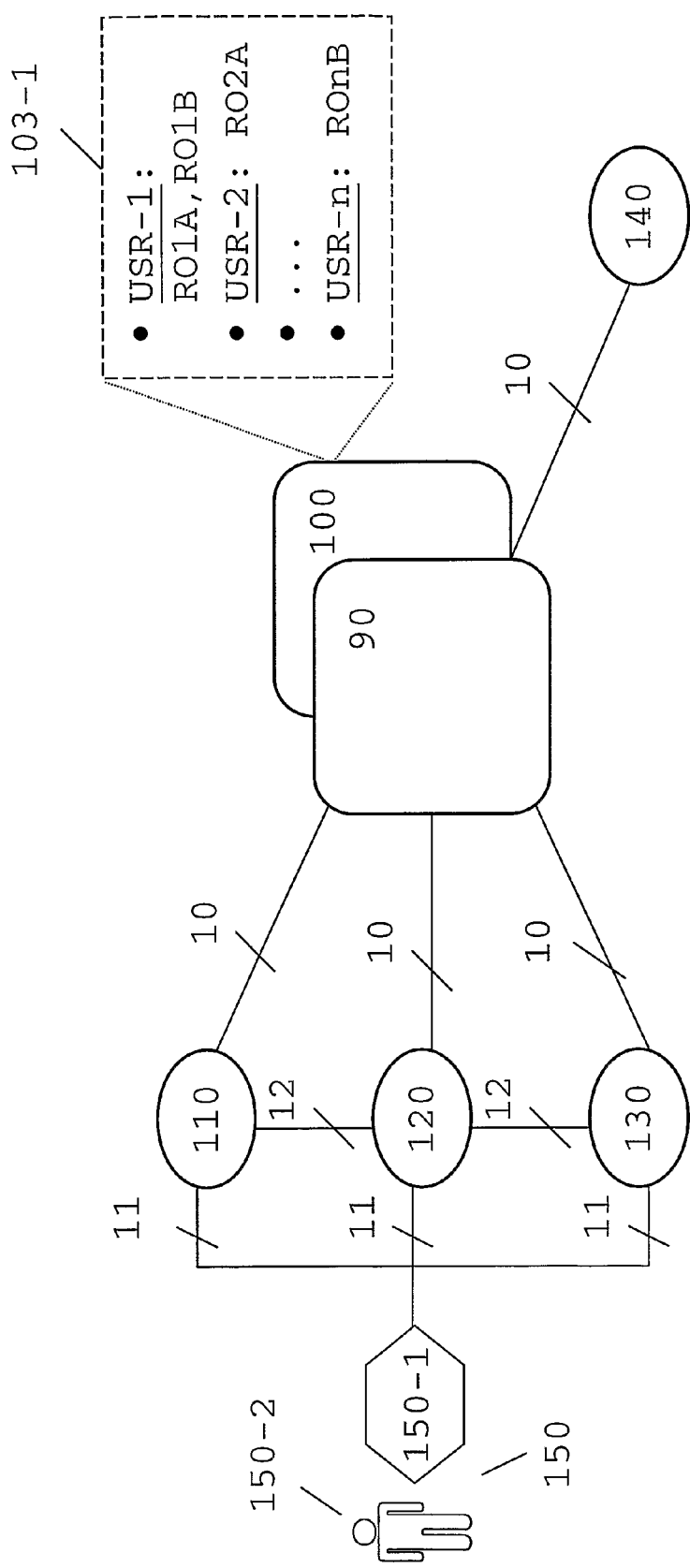
FIG. 1 shows a schematic view of some cooperating entities in an identity federation framework according to the state of the art.
Figure 2:
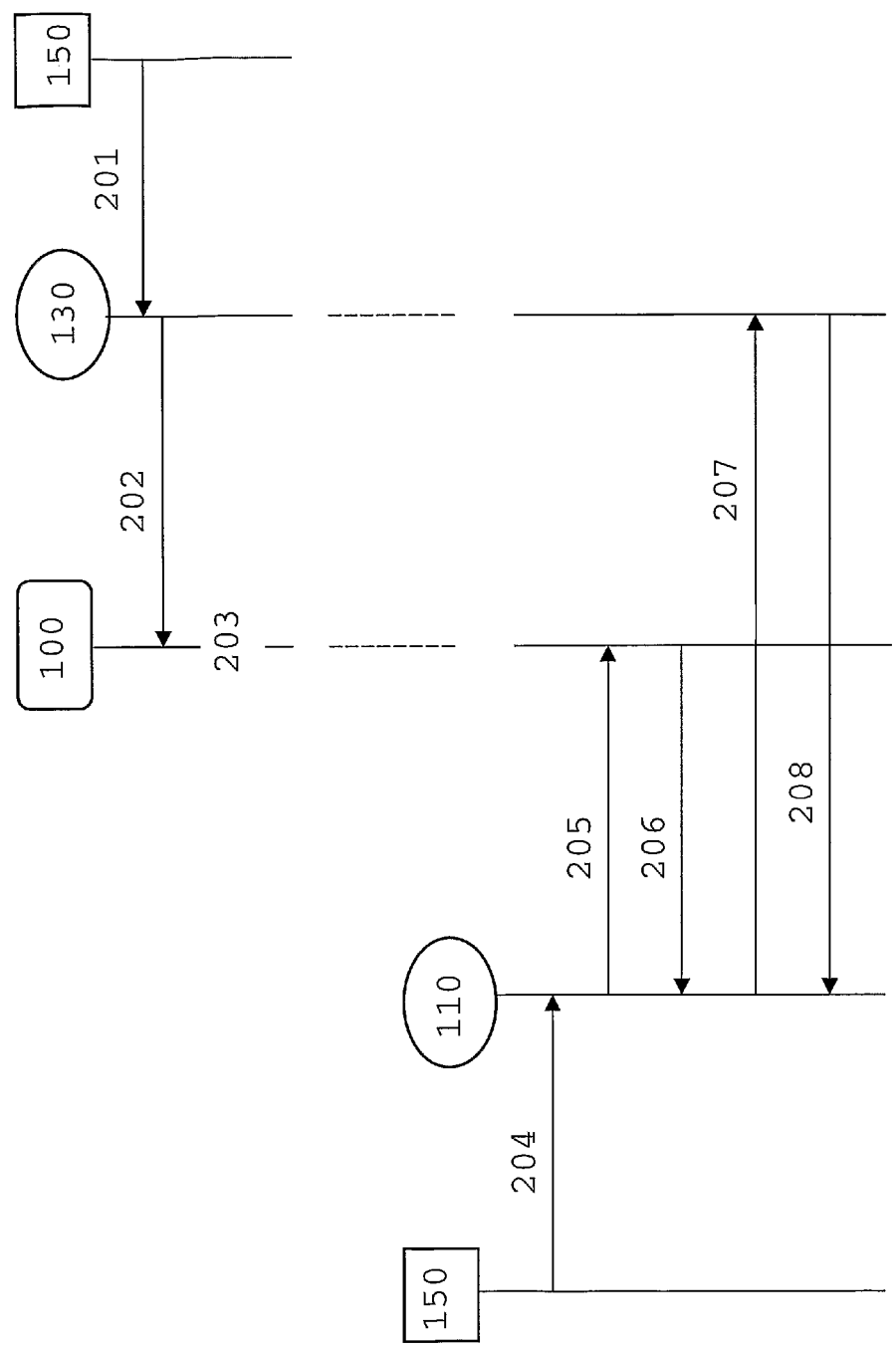
FIG. 2 shows a simplified signaling flow according to the state of the art for, first, registering from a Service Provider an identity service in a Discovery Service server, and then, accessing to said identity service.

The capability registration message may also contain further data that can also be stored (detail not shown in FIG. 3) in the service capability storage (103-2,301) for being later used. For example, for a given identity service that can be provided, the SP may indicate whether it delegates into the DS server the collection of data which can be needed for the provision of the service from the user who is to be served, as well as a form which list them (e.g. service related data such as: language preferences, personal address, preferred mail address, etc). The capability registration message may also include an entry point for the registration of the identity service; wherein this entry point may be e.g. a Uniform Resource Locator URL which can be the same, or different, as the one that a user (150) may have used to request locally the subscription to the service in a SP (130) (as illustrated in flow 201 in FIG. 2). Further, the capability registration message can also include a registration preference indicated from the SP, which may indicate, for example, whether said SP accepts (or prefers) a direct communication with the DS server or other communication method, in order to complete the registration of the identity service. Furthermore, the message might also include some or all of the data needed to build up the RO for one or for a set of users.

Alternatively, the DS server (100) could also periodically query to a plurality of known SPs so as to request from them the same kind of data indicated above for the capability registration message, and then, update accordingly the content of the service capability storage (103-2).

A simplified embodiment to build up a service capability storage (103-2) in a DS server (100) which would not necessarily require communications with SPs (capability registrations or capability queries cited above) may comprise the collection of data about SPs and identity services which are already stored in the plurality of ROs (RO1A,RO1B,RO2A, ROnB) already stored in the DS server. Namely, the collection of identifiers of the SPs stored in each of these ROs (e.g. Provider ID), together with the identifiers of the corresponding identity services (e.g. Service Type), could be considered as building up a service capability storage (103-2) held on the DS server, or, if a high search performance is required, be used to build up a logically separated data base (103-2) in said DS server. Therefore, in this simplified embodiment, the service capability storage (103-2) held on the DS server could be updated with the DS-update messages received from the SPs (e.g. as illustrated in flow 202 of FIG. 2); for example, the capability storage 103-2 could be updated if SP 130 did not appear previously as providing the identity service indicated in the DS-update 202.

Figure 4:
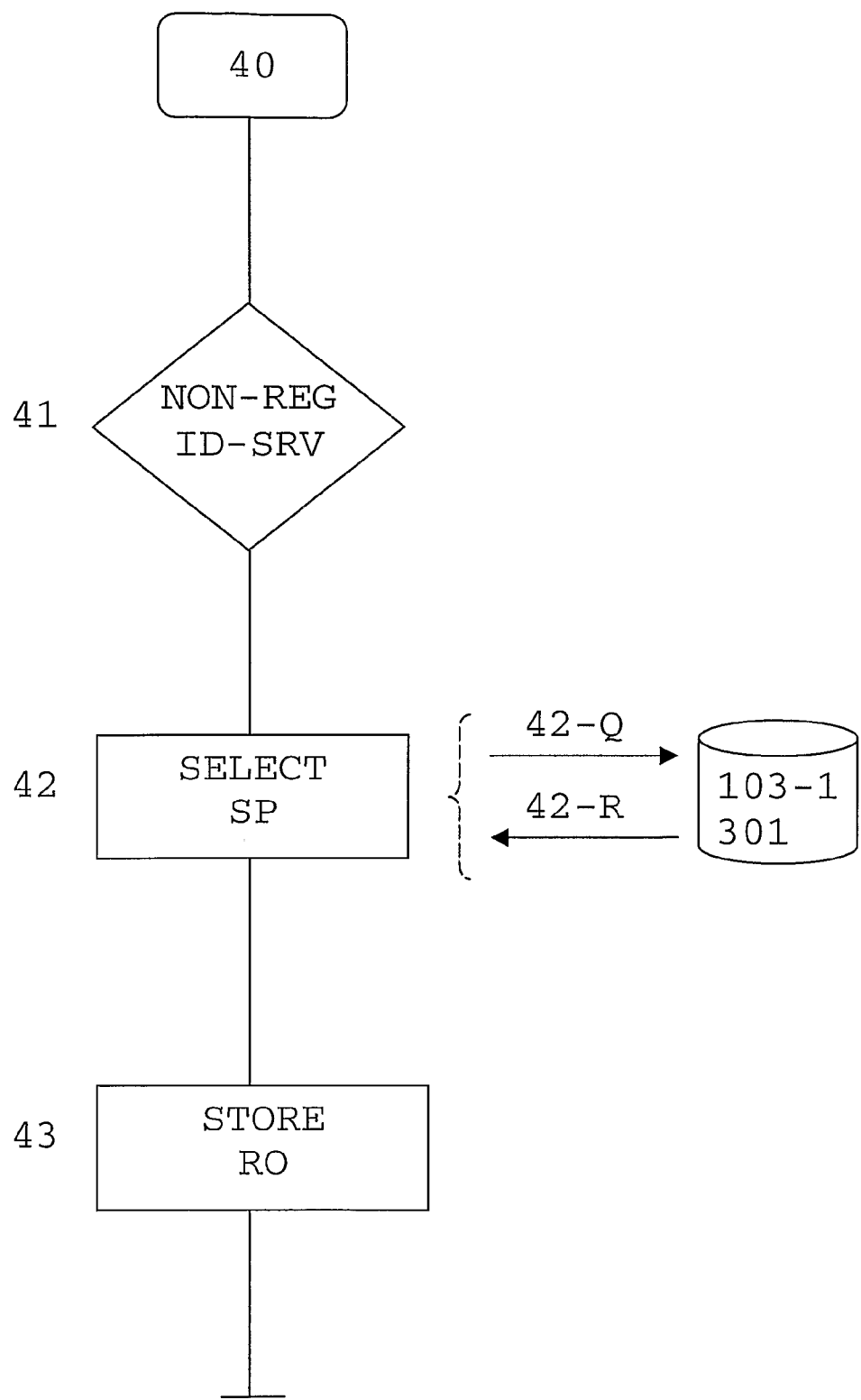
FIG. 4 shows a simplified flowchart of a method according to the invention.
Figure 5:
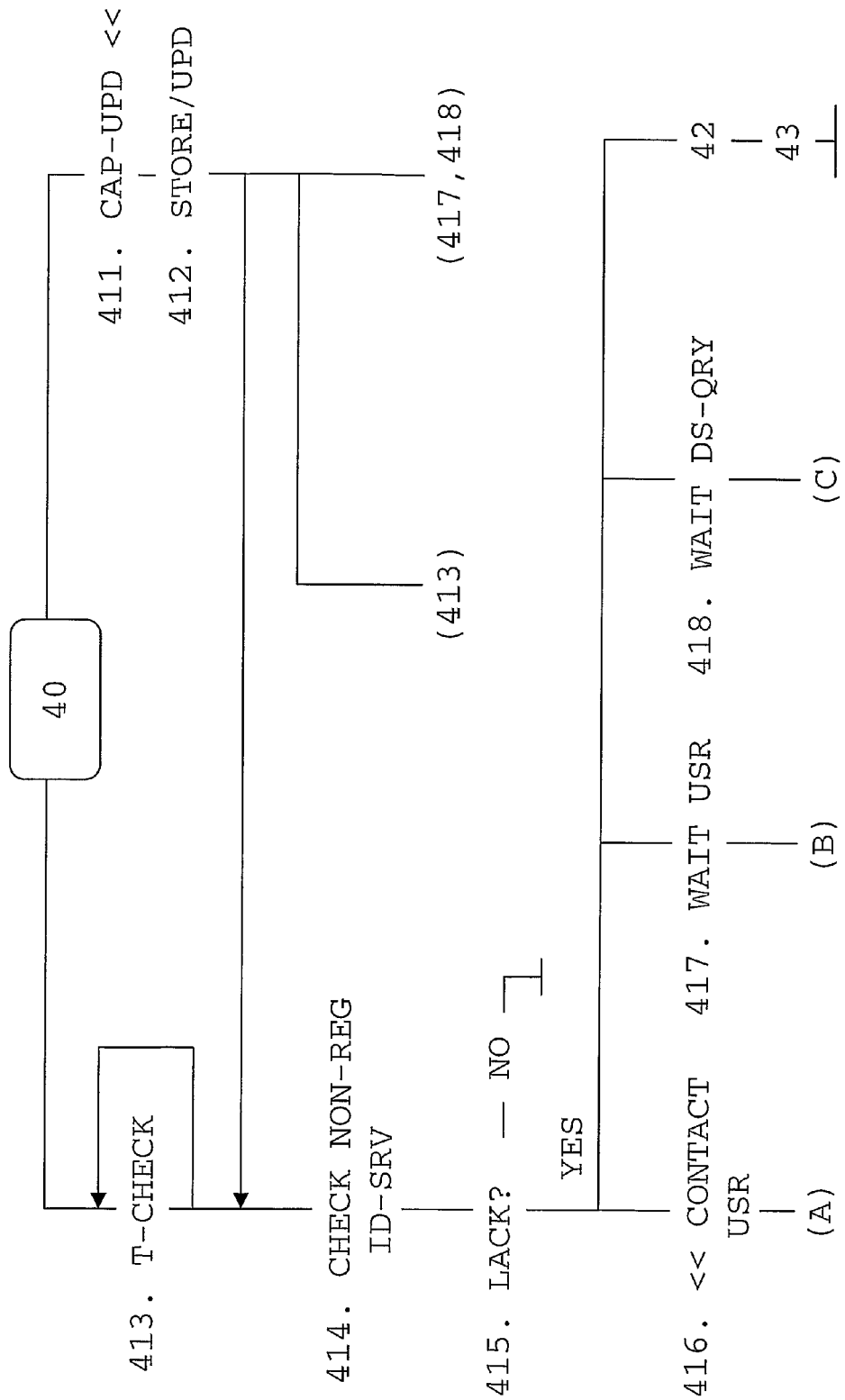
Figure 6:
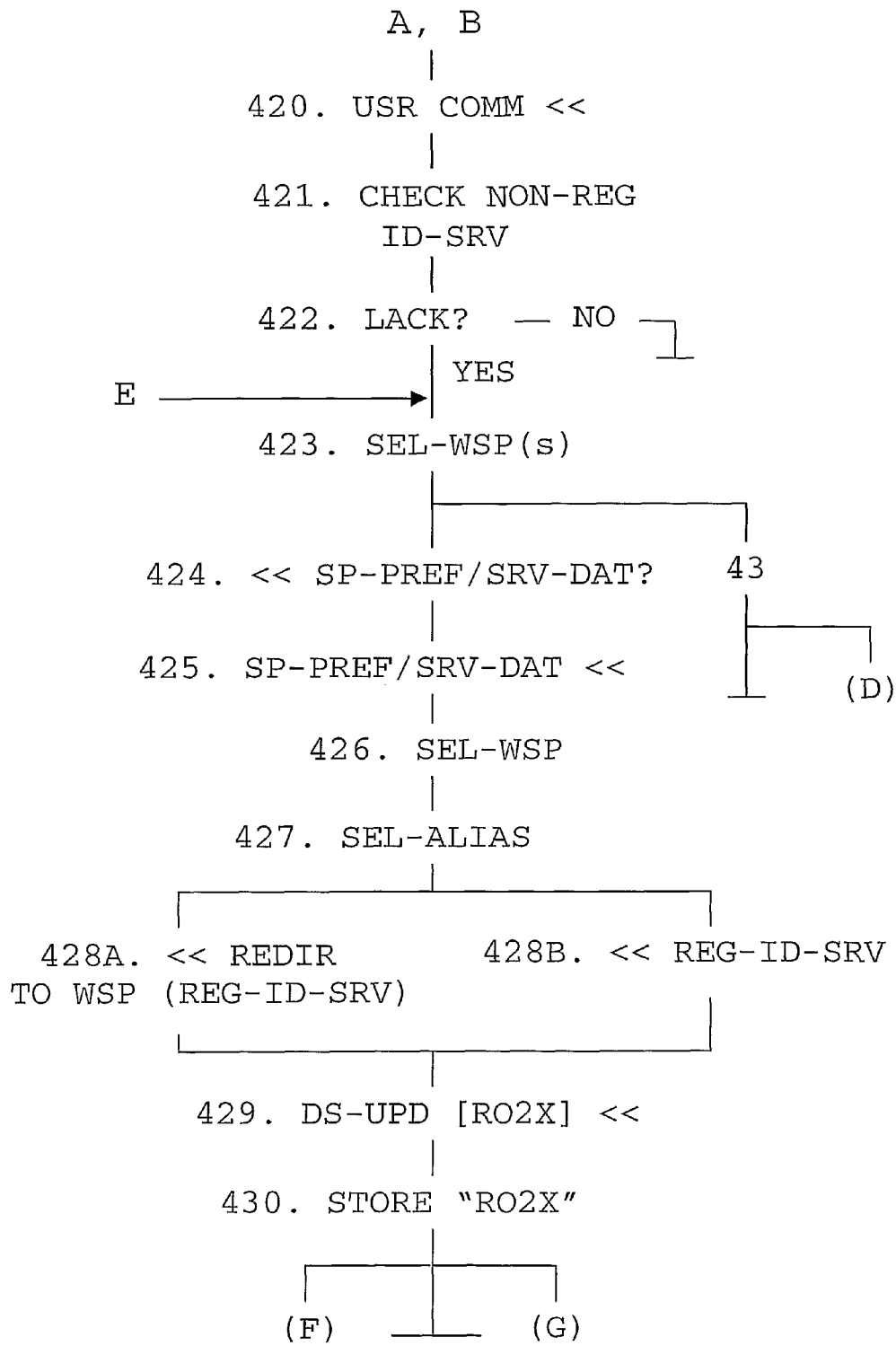

Flowcharts shown in FIGS. 4 to 7 shall be used now to illustrate the operation method (40) of a DS server (100) according to the invention, wherein the simplified flowchart of FIG. 4 illustrate the basics steps (41,42,43) which are further detailed in FIGS. 5, 6 and 7.

In step 41, for determining a non-registered identity service for a user, identity services that can be provided are checked against the content of ROs that per user and identity service are stored in the DS server. In step 42, SPs are selected to provide the non-registered identity services; wherein this generic step may comprise the check (42-Q,42-R) of a service capability storage (103-2,301) as described earlier. Finally, in step 43, a until now non-registered identity service for a user is registered in the DS server (100) by storing the corresponding RO for it; which shall allow hereinafter to provide access from said DS server to said identity service.

FIG. 5 illustrates some steps that can drive to the DS server (100) to an early assessment about the existence of a non-registered identity service of a user, and to take further actions to allow its registration so as to provide access to it when needed. As will be commented with reference to steps 411 and 413 in FIG. 5, this early assessment can take place when a capability registration (CAP-UPD) is received from a SP, or at a periodical check of a service capability storage (103-2, 301). Further alternatives are also possible in which the checking for the ROs of some users can be performed at this stage, or delayed to be executed later, or even not executed, depending on e.g. a specific class-of-service parameter associated to each user or group of users, or depending on a similar parameter associated per identity service. For example, a given user may be associated to a class-of-service for automatic access provision of identity services according to the invention which states that the triggering of the registration process in the DS server shall run in an early stage (e.g. before the identity service is explicitly requested in a DS-query), or later. Similarly, there can be a parameter associated with a given identity service (which could also be received as additional data in a capability registration, and stored accordingly in the service capability storage) that states whether the triggering for the registration in the DS server is preferably carried out in an early phase or not.

Therefore, the assessment for determining non-registered identity services which can take place after the reception (411) of a service capability update or after a periodical check (413) of a service capability storage, can be carried out for one or more identity services and for one or more users, while for some other services or users the assessment may be carried out later (e.g. at reception of a DS-query or at reception of a user communication in the DS server).

In step 411 a capability registration message (CAP-UPD) is received in the DS server (100) from a SP. Next, in step 412, the content of the service capability storage (103-2) is updated with the content of the received message. An alternative implementation comprises a check for non-registered identity services at this stage, as illustrated by the transition to step 414. For example, let's assume that the capability registration message has been received from an SP 140, and reports that it is able to provide a new identity service (e.g. IDSRV-X). Then, step 414 may comprise the checking in the DS of the ROs of one or more users so as to determine whether this identity service is already registered for said user or users, or not. This may be accomplished by checking in one or more ROs whether the service type identifier of this identity service is contained on them. Similarly, a capability registration message (411,CAP-UPD) could have been received from SP 130, and, for example, it might report the withdrawal of an identity service it has been providing so far (e.g. IDSRV-A). In this case, the check of step 414 would then yield what RO(s) are affected (e.g. RO2A), which can make a previously registered identity service for a user (e.g. IDSRV-A for USR-2) to become non-registered from this moment.

Alternatively, or additionally (if, as commented above, there some users or identity services subject to special processing behavior), the checking for determining non-registered identity services can be delayed until a periodical check of the service capability storage (103-2,301) is performed, as illustrated by step 413. A periodical check of the service capability storage with the purpose of determining non-registered identity services for users can be advantageous, since it can make the subsequent provision processes to be executed at certain times for which it is expected have low traffic and service demand. Thus, the period to perform subsequent checks of step 413 can be set up, for example, to execute them everyday at a given time(s), or, for example, be set up on a dynamic basis which may depend on the recent signaling traffic measured in the DS server. In any case, a periodical check of the service capability storage (103-2,301) allows an asynchronous triggering of the registration process for registering non-registered identity services in the DS server which does not depend on when a given SP reports it is providing a new service, or when a given SP reports it withdraws the provision of an old one. Furthermore, said periodical check may facilitate a batch processing for non-registered identity services for a plurality of users.

The check for assessing identity service(s) which are non registered for some user(s) may be further delayed, as indicated by sub-flows "A", "B" and "C". For example, the DS server (100) can wait to the reception of a DS-query (as indicated by step 418), or wait for a communication from a concerned user (as indicated by step 417), which may be used to obtain a user consent for starting the registration of the non-registered identity service from the DS server, or to collect user data and preferences that can be used to perform said registration.

Assuming that the check of step 414 is performed, and assuming that an identity service (e.g. IDSRV-X) is found in step 415 as a non-registered identity service for a given user (e.g. USR-2), there can be various processing alternatives that shall now be described.

In step 416 an alternative is selected which drives to the sending of a request to establish a communication to the concerned user. The request can be sent with the purpose of interacting with the user before starting the service registration; for example, to obtain user consent for starting the registration of the non-registered identity service from the DS server, or to collect user data preferences, consent, etc, for said registration. Said request may be sent through different bearers, and the DS server can use an identifier it knows about the user or obtain it from another server entity (e.g. from the IDP) for addressing said request. For example, the request can be conveyed on a short message (SMS) sent to the user's mobile phone number, or be conveyed on an electronic mail sent to a mail-URL of the user. The request may comprise a URL which maps into a service point of the DS server, or (e.g. in case the user knows how to access to the DS server) convey just a text warning to the user that a new identity service is available for which he is not yet subscribed.

Alternatively, as indicated above, the DS server can wait (step 418) to the reception of a DS-query, or wait (step 417) for a communication from a concerned user, wherein said communication from the user may be received as a result of a previous communication request sent from the DS server (step 416), or be an spontaneous communication received from the user in the DS server. The later case may occur, for example, when a user communicates with a DS server (e.g through a web page it offers) to set up access policies related to his registered identity services.

Steps 42 and 43 of FIG. 5 (which corresponds to steps 42 and 43 referenced in the simplified flow of FIG. 4) represents, respectively, the selection of a SP for providing a non-registered identity service detected in steps 414 and 415, and the provision of its corresponding RO in the DS server (100) for registering it for a user, according to a simplified embodiment. This embodiment would not require user intervention nor communication with the selected SP, and can be suitable in some situations wherein the DS server may have access to user and SP data so as to build up directly a RO for said identity service as provided for said user by said SP. For example, some of said data have been received from the SP in a capability registration message, while some other data are related to the registration of another identity service for the same user in the same SP and may be reused. In this case (but not limited to it), a SP in which the concerned user is already known (e.g. the user has already a service account with said SP, or the SP is already serving another identity service for said user) is preferably selected in step 42.

A further processing alternative (not shown in FIG. 5) may be selected after the determination of steps 414 and 415, which involves communication between the DS server with the selected SP, but which does not require user intervention nor needs the DS server to wait for the reception of a DS-query requesting a RO that corresponds to a non-registered identity service. The processing steps for accomplishing with this alternative shall be later commented with reference to some steps shown in FIG. 6.

The flow shown in FIG. 6 shows some processing steps that are carried out by the DS server (100) when a communication from a user is received. As illustrated by previous sub-flows "A" and "B", this can be a result of a request previously sent to the user from the DS server (416), or be a spontaneous communication received from the user in the DS server.

In step 420 a communication of a user (for example a HTTP "Get" message) is received in the DS server (100). Next, in step 421 a check is performed over the RO(s) stored for this user for his registered identity services against one or more identity services that can be provided for him and which are still not registered. If a non-registered identity service is found for this user (step 422), then a SP may be selected in step 423. As stated earlier, the check of a service capability storage (103-2,301) may be used to assess in the determination of non-registered identity services, as well as in the subsequent SP selection.

A simple realization could consist on a subsequent provision and storage (step 43) of the corresponding RO in the DS server (100), which could be accomplished as described earlier with reference to steps 42 and 43 of FIG. 5.

The check on the service capability storage (103-2,301), which is performed in step 423 for selecting a SP, may result in that more than one SP are found to be able to provide the concerned identity service. A suitable solution in this case may comprise the selection of one SP the user has already a service account with; for example a look-up can be performed in the DS server across other ROs stored for this user in order to find out a SP that matches one of the SPs found in step 423. More than one SP could also fulfill this condition, and, as an implementation option, the DS server could directly elect any of them. On step 423 it can also be found that a SP, which was found suitable to serve the concerned identity service, has stated (e.g. on a capability registration for this service) that it delegates to the DS the collection of certain service specific related data from the user (e.g. language preferences, personal address, credit account number, etc). Furthermore, in some cases it might be required to obtain explicit user consent before triggering the registration of the non-registered identity service.

Therefore, in these cases (multiple selectable SPs, user consent needed, delegation of service data collection), it might be desirable to prompt the user to select one SP among a plurality of SPs, and also to prompt him to enter some or all of these service related data. In step 424 a communication is sent to the user with this purpose, and, in step 425, a communication from the user is received as a result, which can comprise a service provider preference (SP-PREF) and/or service related data (SRV-DAT). Also, in a communication request (416,424) sent to a user (or in established communication with said user) the DS server may prompt to said user to enter said service provider preference (SP-PREF) and/or service related data (SRV-DAT). The service provider preference (SP-PREF) can take different formats and may be assumed to be a user consent (although a specific assertion for this purpose could also be used in the user communication 425). For example, if the user has received a list with the URIs of a plurality of SPs, then the service provider preference (SP-PREF) can comprise the URI of one of them. Also, the user can indicate a preferred domain (e.g. "xzy.com"), which would make the DS server to select a suitable SP belonging to this domain. Further, the user could indicate that "any" of the selectable SPs may be selected, in which case the DS server would be free to select one according to any further criteria (e.g. fully random, less loaded SP, etc.). Next in step 426 it is selected a SP according to the user stated preferences.

As commented earlier, in some cases the selected SP is preferably acquainted with the concerned user. In an identity federation framework this acquaintance usually implies that the user has a federated service account with said SP, which in turn, according to known mechanisms in these frameworks, implies that a user identifier is shared for a user between said SP and the central serving entities (e.g. a server entity providing an IDP service or the one providing a discovery service DS; which, as already commented, use to be co-located within the same server machine). Said user identifier, usually known as "user alias" is, for privacy reasons, different for the same user across different SPs.

Step 427 summarizes a part of the SP selection process which considers whether the user is known in the selected SP or not (or, in other words, whether the SP is acquainted with the user because e.g. the user has federated an identity through it). If the user is already known by the selected SP, then the user alias shared with said SP for said user is then selected for referring to said user in a further communication with said SP. Otherwise, the user would have to be federated in the selected SP, which may be accomplished, for example, using one of the alternatives that shall be described with reference to subsequent steps in FIG. 6.

Regardless whether the user is known or not to the selected SP, there are two basic modes to complete the registration of the non-registered identity service, and to subsequently provide the corresponding RO in the DS server, whenever a communication with the selected SP is needed or desired for making said provision.

Step 428A represents a first mode which implies redirecting the user to the selected SP. This may be accomplished, for example, by means of a HTTP "redirect" for redirecting a communication established between the user (150) and the DS server (100) towards the SP (e.g. 140) that has been selected to act as web service provider (WSP) for providing the concerned identity service. Step 428B represents a second mode which implies the establishment of a direct communication between the DS server (100) and the selected SP (e.g. 140) (e.g. using a well-known protocol binding—such as SOAP—for the so called "back channel" for communications between server entities).

The communications of steps 428A and 428B are in fact a request for providing an identity service from the SP that receives them, and may comprise, among other: a specific code to state that the registration of a non-registered identity service is requested, an identifier of the concerned identity service, and an identifier usable to identify the concerned user in the DS server (e.g. the RO-DS for this user). These communications, may further comprise service related data (SRV-DAT) that have been collected from the user, and may be addressed by using, or including, an identifier of a service entry point that can have been received (411) from the selected SP in a capability registration message. The term "direct communication", cited for step 428B, should be understood as embracing also a communication established between the DS server and the selected SP, which may involve several routing entities in between; as opposed to an "indirect" way of sending the request for providing, such as embedded in a redirection request, as in step 428A.

If the user is known in the selected SP, then the shared (federated) user alias for this user in this SP may also be included in the requests sent in steps 428A or 428B. If the user is not yet known in the selected SP, then, the DS server may include a dummy identifier for the user (or some other indicator agreed as "default", or which can be recognized as such) which can be interpreted in the receiver SP as a need for federating an identity of said user from said SP. For example if the user is redirected towards the selected SP (428A), the DS server may include a dummy identifier (or no identifier) for the user; thus, as the selected SP will then not be able to identify the user it may interact with him to find out if he already has a service account with it, or to create a new account in this SP. Then, the SP would subsequently request for user federation (e.g. sending an authentication request message towards the IDP, and the IDP would return back, among other, user alias, and the information for communicating with the DS server for this user (i.e. the RO-DS for this user for further DS-queries or DS-updates). Alternatively, the DS server may take the necessary steps (not detailed in FIG. 6, but deemed to be performed under step 427) so as to create and store in the IDP (90) a pre-assigned alias for this user in relationship with the selected SP; wherein said alias, together with the corresponding RO-DS, may also be sent in the request for providing (428A, 428B). In any case (user previously known or not in the selected SP), the selected SP might need to interact with the user (e.g. to collect some further data that could be needed for the final provision of the service). Therefore, whenever a further interaction between the concerned user and the selected SP might be needed (or foreseen), the redirecting alternative of step 428A is preferably selected.

As a result of the request for providing the non-registered identity service sent to the selected SP in steps 428A or 428B, a DS-update (or other equivalent message) is received from said SP in step 429 that contains the RO that has been built by said SP (RO2X). To accomplish this, the processing means in a SP may be modified to respond to a request for providing an identity service made from a DS server in a similar way as when a user contacts with it (e.g. flow 201 in FIG. 2), so as to make a similar request (202,429). Alternatively, a specific message may be used in replacement of the commonly used DS-update, in so far as it is able to convey a RO or some data usable to build it. Subsequently, the received RO is stored by the DS server in step 430, thus, registering the until now non-registered identity service, and making possible to answer with it to a further DS-query which may be eventually received in said DS server for requesting access to said identity service of said user.

It shall be noticed here that the execution flow corresponding to the aforementioned steps 423, 427 and 428B can constitute an execution alternative for the provision of a RO when a non-registered identity service is detected in an early stage (steps 414 and 415 in FIG. 5), which would not require user intervention. Accordingly, when a non-registered identity service for a user is detected in an early stage without user intervention, for example: after a capability registration (step 411), or after a periodical check of a service capability storage (step 413); the DS server can select a suitable SP and send a request for providing said identity service directly to said SP (step 428B), which would end up with the storage (step 430) of the corresponding RO (RO2X) received in the subsequent DS-update from the SP (step 429).

The flowcharts shown in FIG. 7 shows some processing steps that are carried out by the DS server (100) when a DS-query is received (step 4210) from a SP, which, acting as a web service consumer (WSC), request access to an identity service of a user, and said identity service has not yet been registered for said user. As cited earlier, these processing steps can take place whenever the DS server of the invention has delayed for any reason the registration of a non-registered identity service for a user (e.g. a condition to wait a DS-query has been set for the user or for the service, the DS-query is received before a periodical check of the—updated—service capability storage has taken place, a batch processing of non-registered identity services is still pending for some users, etc).

Steps 4211 and 4212 may represent the current processing in a DS according to the state of the art, which, as stated in the background section, implies a check to determine whether the identity service indicated in the received DS-query corresponds to any of the ROs stored for the involved user. Three different alternatives are illustrated in FIG. 7 to process according to the invention the case in which the requested identity service is not registered in the DS server for said user.

In a first alternative (step 4213A), a redirection request is sent back to the SP that sent the DS-query, requesting to redirect the user to the DS server. The redirection request may be sent embedded within a DS-response, or in another kind of message requesting so, and can comprise (as in the case of the communication of step 416) a URL that maps into a service point of the DS server. In a second alternative (steps 4213B and 4214B) the DS server may send a request to establish a communication to the concerned user, as commented before with reference to step 416. In this second alternative, the DS server may send also a DS-response with no RO (step 4213B), or just leave the DS-response pending until the corresponding RO for the requested identity service is available. The third alternative would correspond to a simplified embodiment that would not require user intervention nor communication with the selected SP for the provision and storage of the corresponding RO. The processing steps for this simplified embodiment are illustrated by the transition to sub-flow "E", which would continue in FIG. 6 with steps 423 and 43 for, respectively, the selection of a suitable SP and the subsequent provision and storage of the generated RO, and which would return back to the step 4216B in FIG. 7, as shown by sub-flow "D", from which a DS-response comprising the generated RO (RO2X) would be sent back to the SP which sent the DS-query.

A fourth alternative to be selected after step 4212 which has not been independently illustrated, and which would not require to establish a communication with the user, would comprise the execution of steps: 423, 427, 428B, 429 and 430, described earlier with reference to FIG. 6. The execution of this alternative would be continued through transition "G" back to the processing flow shown in FIG. 7.

For the first two alternatives described above (respectively: step 4213A, and step 4214B (preceded or not by step 4213B), the execution flow would continue with the reception of a user communication (as illustrated by transition to flow "A" in FIG. 6), which would be processed as described earlier with reference to the processing flow shown in FIG. 6. Then, as indicated by the transition alternatives "G" and "F", the execution flow would go back to FIG. 7; wherein it would continue directly (flow "G") if the request for providing was sent directly to the selected SP (step 428B of FIG. 6), or, in case the request for providing was sent in a redirection (step 428A of FIG. 6), it would wait (flow "F") the reception of the redirection which is received back from the selected SP in step 4215. The redirection received from the selected SP may contain the RO that it has generated (RO2X), which can be an option to make unnecessary the sending of a DS-update (step 429) that said SP has sent as a result of a received request for providing (steps 428A or 428B). Also, the redirection received in step 4215, as well as the DS-update (or equivalent message) received in step 429, may comprise some data for facilitating the served user to access, manage, etc, the resources the identity service exposes, which may be then delivered to the user through subsequent communications (e.g. a URL which is usable to address access or management of a concerned resources, for example, to facilitate checking a calendar, change personal data, etc).

Two processing alternatives can be selected after step 4215 or after transition sub-flow "G". A first alternative comprises the sending of a DS-response containing the RO that has been received from the selected SP, as illustrated by step 4216B. The execution may also continue on step 4216A, in which the user is redirected back to the SP that sent the DS-query. Then, as illustrated by subsequent steps 4217A and 4218A, a subsequent DS-query from an SP which is acting as WSC (i.e. an SP which is serving the user a service which needs the consumption of a resource of the identity of said user via invocation of an identity service), may be successfully answered with the corresponding RO (RO2X).

Figure 8:
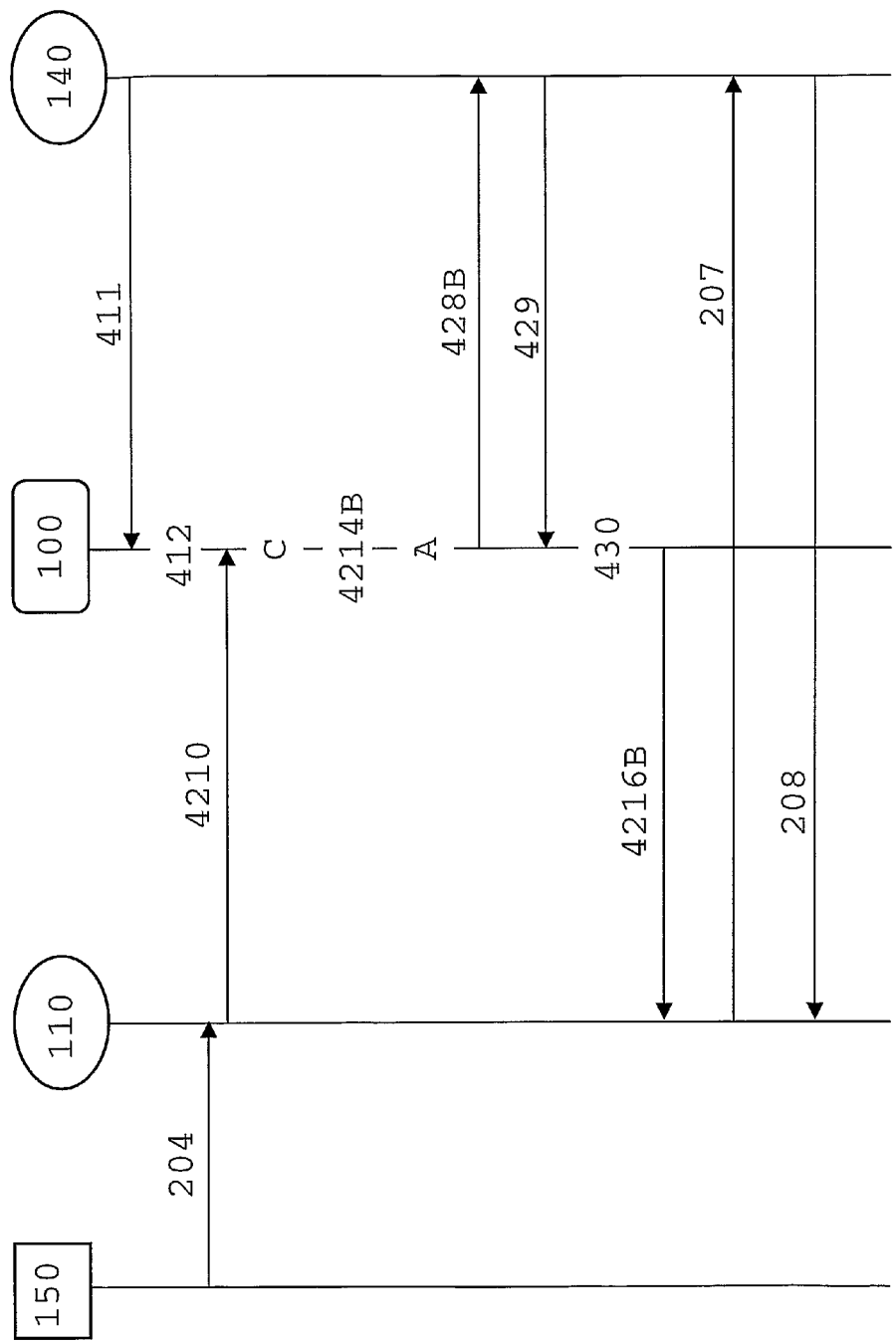

Signaling flows that correspond to some of the processing steps described earlier with references to FIGS. 5 to 7 are shown in FIGS. 8 and 9, and shall be used to illustrate an example to provide access from a DS server to a non-registered identity service of a user, wherein said provision takes place at reception of a DS-query.

In flow 411 of FIG. 8, a capability registration is received from SP 140 in the DS server 100. For example, SP 140 reports it can provide from now on an identity service, for example IDSRV-X. The DS server updates accordingly (412) the service capability storage (103-2) so as to state that SP 140 can serve this identity service (as illustrated in FIG. 3). As cited earlier with reference to FIGS. 5 to 7, the DS server could start the provision of the identity services which are (or become) non-registered for some users in virtue of the updating received in the capability registration; however, as cited above, in the examples illustrated in FIGS. 8 and 9, it shall be illustrated the option case in which the DS server 100 waits until a DS-query is received which points out the lack of the RO of the corresponding non-registered identity service for a user.

Later, in flow 204, user 150 accesses to SP 110 and requests a given service. For simplicity reasons, authentication flows, which usually run between the user 150, the accessed SP 110 and an IDP 90 that provides the authentication assertion to SP 110, are not shown in FIGS. 8 and 9. The service accessed by user 150 in SP 110 may be, for example, a flight booking service that offers also an extra service that comprises the updating of the user's calendar. That means that, for providing said extra service, it has to become a WSC, since it needs to gain access through an identity service to a resource of said user (calendar data in this case) that is hosted by other SP; i.e. a SP acting as WSP for this resource. Accordingly, SP 110 sends a DS query (flow 4210) to the DS server which comprises the resource identifier for addressing the RO(s) stored for this user an identifier of the requested identity service type. For the purpose of illustrating this example, "IDSRV-X" can be assumed to be the service type identifier established for identifying the "calendar" service. The received DS-query is processed (C) in the DS server and, for example, it is found that there is no RO for this user (150) and this service (IDSRV-X) stored in the DS server storage area 103-1. As described earlier, the DS server may then interact with the user 150 (A) before further proceeding to provide the corresponding RO for registering identity service IDSRV-X for this user.

FIG. 8 shows a possible alternative previously described in which the DS server 100 sends (flow 428B) a request for providing towards the selected SP 140. As a result, a DS-update (flow 429) is received from SP 140 that conveys a RO for this user and the indicated service (e.g. RO02X), which is stored (430) by the DS server for this user in the RO storage area (103-1). Next, the DS server sends (flow 4216B) a DS-response to the received DS-query (flow 4210) that comprises the recently registered RO (RO02X). Subsequently, SP 110, acting as WSC, uses data of the received RO (RO02X) to access (flow 207) to SP 140, which acts then as WSP serving the requested identity service. Depending on the kind of action that SP 110 requests to SP 140 (which, in turn, can depend on the nature of the service and, essentially, in the operations that has been defined for it) the interaction between the WSC (SP 110) and the WSP (SP 140) may involve more than the single round trip communication shown in FIG. 8. For example, flow 208 may represent just a response for a simple operation (e.g. read or update the calendar data); however there could be more signaling flows for more complex operations.

Flows 411, 204, and 4210 of FIG. 9 take place and are processed as described above with reference to FIG. 8. However, FIG. 9 illustrates a different alternative for sending the request for providing to SP 140, as well as a way of contacting with the user.

In flow 4213A a redirection is sent back to the SP 110. The redirection requests to redirect a communication that said SP has with the user 150 towards the DS server 100, and may comprise (e.g. if it is guessed that it may be unknown for the user) a usable reference to contact with the DS server (e.g. a URL which maps into a service point of the DS server). The user is then redirected and enters in communication with the DS server (flow 420). The DS server may then interact with the user 150 (A), e.g., for collecting user preferences to select a SP, for collecting service related data for the service to be provided, etc. The communication with the user 150 is then redirected to the selected SP 140 (flow 428A). The subsequent communication between the user 150 and the SP 140 may serve, among other, to collect the same kind of data referred earlier that, according to some other embodiments, may be collected by the DS server, or to complete the collection of said data (e.g. in case the DS server did not collect from the user all the necessary data).

Subsequently, a DS-update (flow 429) is received from SP 140 that conveys a RO for this user and the indicated service (e.g. RO02X), which, as in the previous example flow of FIG. 8, is stored (430) by the DS server for this user in the RO storage area (103-1). Then, SP 140 redirects back its communication with user 150 towards the DS server 100 (flow 4215). As commented earlier, this redirection may convey the generated RO (RO02X), thus making unnecessary the sending of the DS-update (429). The communication with the user in the DS server is then redirected back (FLOW 4216A) towards the querying SP 110; wherein said redirection may comprise an indication that the identity service has been just provided, or the corresponding RO (RO2X) usable for accessing the requested identity service. Alternatively, these chained redirections could be reduced by including some return information which addresses to SP 110; thus, allowing SP 140 to redirect the user directly towards SP 110 (which would make then necessary the sending of a DS-update 429).

The subsequent flows shown in FIG. 9 consider that no RO has been sent back to SP 110. Thus, in flow 4217A a DS-query is received requesting the newly registered RO (RO02X), which is answered from the DS server 100 with a DS-response in flow 4218A. Subsequent flows 207 and 208 take place as described earlier with reference to FIG. 8.

Although not shown in FIG. 7 or 8, there can be a further interaction between SP 110 and the user 150 as a result of the access from SP 110 to the requested identity service, for example, to confirm that the service he requested has been fully accomplished. Following the example case cited above, SP 100 could further indicate to the user 150 that his calendar has been updated accordingly.

Server entities in a state-of-the-art telecommunications system are commonly implemented in computer-based machines. Accordingly, computer programs having computer-readable program codes are loaded in computer-based server entities of telecommunications systems, causing each of said server entities to behave according to a predefined manner that is in accordance to their specific functionality. Thus, those skilled in creating and/or modifying computer programs intended to be loaded in a computer-based DS server, would, without departing of the teachings of the present invention, readily apply those teachings to create and/or modify computer programs which, when executed in a computer-based DS server, would make it to behave according to any of the described embodiments.

The invention has been described in respect to some exemplary embodiments in an illustrative and non-restrictive manner. Variations can be readily apparent to those of ordinary skill in the art. For this reason, the invention is to be interpreted and limited in view of the claims.

The invention claimed is:

1. A method of providing access to a non-registered identity service of a user from a Discovery Service server comprising the steps of:
   a) storing in said Discovery Service server a resource offering for a registered identity service of said user, said identity service being provided by a Service Provider, and said resource offering comprising a reference usable to contact with said Service Provider to access said identity service,
   b) receiving in said Discovery Service server a discovery service query to obtain a resource offering of said user,
   c) answering said discovery service query with a discovery service response containing a resource offering of a registered identity service of said user and providing access from said Discovery Service server to a non-registered identity service of a user by:
   d) selecting from said Discovery Service server a Service Provider for providing said non-registered identity service for said user and checking a service capability storage to select a Service Provider that can provide said identity service, wherein said service capability storage comprises: at least one identifier of a Service Provider, and at least one identifier of at least one identity service that can be provided from said Service Provider;
      sending a service capability query to an external service capability storage, said query comprising an identifier of an identity service, and
      receiving a response to said query comprising an identifier of a Service Provider that can provide said identity service and
   e) storing in said Discovery Service server a resource offering for registering said identity service of said user as provided by said selected Service Provider.

2. The method of claim 1, wherein the checking step is repeated periodically.

3. The method of claim 1, further comprising the step of:
storing said server capability storage in said Discovery Service server, wherein the storing said server capability step is executed prior to the checking a service capability step.

4. The method of claim 3, further comprising the steps of:
f) receiving in said Discovery Service server a capability registration from a Service Provider, said capability registration comprising an identifier of an identity service that can be provided from said Service Provider, and
g) updating said server capability storage stored in said Discovery Service server with the content of said capability registration.

5. The method of claim 1, further comprising the step of:
h) checking in said Discovery Service server a first identity service against the resource offerings stored for the registered identity services of a user to determine whether said first identity service is a non-registered identity service of said user.

6. The method of claim 5, further comprising the steps of:
sending from said Discovery Service server request for establishing a communication with said user if said first identity service is a non-registered identity service of said user, and
receiving a communication from said user in said Discovery Service server as a response to said request for establishing.

7. The method of claim 1, further comprising the step of:
receiving in said Discovery Service server a communication from said user comprising a service provider preference indicated by said user in said communication, and wherein the step "d" further comprises the step of:
selecting one Service Provider among a plurality of Service Providers that can provide said identity service according to said service provider preference.

8. The method of claim 1, further comprising the step of:
receiving in said Discovery Service server a communication from said user comprising service related data indicated by said user in said communication, said service related data being usable for the provision of said identity service from a selected Service Provider.

9. The method of claim 1, wherein the step "d" further comprises the steps of:
sending from said Discovery Service server to said selected Service Provider a request for providing said identity service for said user from said selected Service Provider,
receiving in said Discovery Service server a discovery service update from said selected Service Provider as a result of said request, said discovery service update comprising a resource offering for registering said identity service of said user in said Discovery Service server, and wherein the step "e" further comprises the step of storing in said Discovery Service server said received resource offering.

10. The method of claim 9, wherein the sending from said Discovery Server step, further comprises the service related data usable for the provision of said identity service for said user from said selected Service Provider.

11. The method of claim 9, wherein the sending from said Discovery Server step further comprises one step selected from:
sending said request for providing included in a discovery service response sent as an answer to a received discovery service request received in said Discovery Service server,
sending said request for providing included in a redirection request for redirecting a communication established between said Discovery Service server and said user towards said selected Service Provider, or
sending said request for providing from said Discovery Service server directly to said selected Service Provider.

12. A Discovery Service server for providing access to an identity service of a user, comprising:
a data storage module comprising a first data storage for storing a resource offering for a registered identity service of a user, said identity service being provided by a Service Provider, and said resource offering comprising a reference usable to contact with said Service Provider to access said identity service,
a communication module for exchanging signaling for communicating with other communicating entities, and
a processing module for processing said signaling and for controlling the storage and retrieval of data in said data storage module, said processing module being arranged to prompt said communication module to send a service capability query to an external service capability storage, said service capability query comprising an identifier of an identity service, wherein said communication module is arranged to receive a response to said service capability query comprising an identifier of a Service Provider that can provide said identity service, and said processing module is responsive to the reception of said response so as to select a Service Provider according to the content of said response, wherein said signaling comprises at least:
the reception of a discovery service query to obtain a resource offering of a user,
the sending of a discovery service response containing a resource offering of a registered identity service of said user, wherein said processing module is responsive to the reception of a discovery service query so as to check the content of said first data storage and to prompt said communication module to send said discovery service response and to provide access from said Discovery Service server to a non-registered identity service of a user, said processing module is arranged:
to select a Service Provider for providing said non-registered identity service for said user,
to store in said first data storage a resource offering for registering said identity service of said user as provided by said selected Service Provider, and
to check a service capability storage comprising at least one identifier of a Service Provider, and at least one identifier of at least one identity service that can be provided from said Service Provider.

13. The Discovery Service server of claim 12, wherein said processing module is arranged to repeat said check periodically.

14. The Discovery Service server of claim 12, wherein said data storage module further comprises a second data storage to store said server capability storage, and wherein said processing module is arranged to check said second data storage in said Discovery Service server to select said Service Provider.

15. The Discovery Service server of claim 14, wherein said communication module is arranged to receive a capability registration from a Service Provider, said capability registration comprising an identifier of an identity service that can be provided from said Service Provider, and wherein said processing module is responsive to the reception of said capability registration so as to update the content of said second data storage with the content of said capability registration.

16. The Discovery Service server of claim 12, wherein said processing module is arranged to check a first identity service against the resource offerings stored for the registered identity services of a user in said first data storage to determine whether said first identity service is the non-registered identity service of said user.

17. The Discovery Service server of claim 16, wherein said processing module is responsive to perform said check for said first identity service and said user at a:
- reception of a discovery service query requesting to obtain a resource offering of said user or
- reception of a capability registration from a Service Provider, or
- a periodical check of a service capability storage, or
- reception in said Discovery Service server of a communication from said user.

18. The Discovery Service server of claim 16, wherein said processing module is responsive to the detection of the non-registered identity service for a user so as to prompt said communication module to send a request for establishing a communication with said user.

19. The Discovery Service server of claim 12, wherein said communication module is arranged to receive a communication from said user comprising a service provider preference indicated by said user, and wherein said processing module is responsive to said communication so as to select a Service Provider according to said service provider preference.

20. The Discovery Service server of claim 12, wherein said communication module is arranged to receive a communication from said user comprising service related data indicated by said user, said service related data being usable for the provision of said identity service from a selected Service Provider.

21. The Discovery Service server of claim 12, wherein for providing access to a non-registered identity service of a user, said processing module is further arranged to prompt said communication module to send to said selected Service Provider a request for providing said identity service for said user from said selected Service Provider.

22. The Discovery Service server of claim 21, wherein said request for providing comprises service related data usable for the provision of said identity service for said user from said selected Service Provider.

23. The Discovery Service server of claim 22, wherein said service related data comprises at least part of the service related data received in a communication from the user.

24. The Discovery Service server of claim 21, wherein said request for providing is included in:
- a discovery service response sent as an answer to a received discovery service request received in said Discovery Service server, or
- a redirection request for redirecting a communication established between said Discovery Service server and said user towards said selected Service Provider, or
- a direct communication from said Discovery Service server to said Service Provider.

25. The Discovery Service server of claim 21, wherein said communication module is arranged to receive a discovery service update from said selected Service Provider as a result of said request for providing, said discovery service update comprising a resource offering for registering said identity service of said user in said Discovery Service server, and wherein said processing module is responsive to the reception of said discovery service update so as to store in said first data storage said received resource offering.

26. The Discovery Service server of claim 12, wherein the data storage module comprises at least one data storage device, wherein the communication module comprises at least one communication device for exchanging signaling, and wherein the processing module comprises at least one processor for processing the signaling received by a communication device and for prompting a communication device to transmit the signaling to be sent.

* * * * *

UNITED STATES PATENT AND TRADEMARK OFFICE
CERTIFICATE OF CORRECTION

| | | |
|---|---|---|
| PATENT NO. | : 7,836,484 B2 | Page 1 of 1 |
| APPLICATION NO. | : 11/568965 | |
| DATED | : November 16, 2010 | |
| INVENTOR(S) | : Pardo-Blazquez et al. | |

It is certified that error appears in the above-identified patent and that said Letters Patent is hereby corrected as shown below:

On the title page, item (56), under "OTHER PUBLICATIONS", in Column 2, Line 3, delete "projectlliberty.org" and insert -- projectliberty.org --, therefor.

In Column 6, Line 13, delete "claim 16." and insert -- claim 12. --, therefor.

In Column 21, Line 56, in Claim 10, delete "Discovery Server" and insert -- Discovery Service server --, therefor.

In Column 21, Line 60, in Claim 11, delete "Discovery Server" and insert -- Discovery Service server --, therefor.

In Column 23, Line 11, in Claim 17, delete "user or" and insert -- user, or --, therefor.

Signed and Sealed this
Twenty-fifth Day of January, 2011

David J. Kappos
*Director of the United States Patent and Trademark Office*